(12) United States Patent
Jaranson et al.

(10) Patent No.: US 8,449,011 B2
(45) Date of Patent: May 28, 2013

(54) MONOPOD SEAT STRUCTURE FOR AUTOMOTIVE SEATS AND METHOD

(75) Inventors: John W. Jaranson, Dearborn, MI (US); Johnathan Andrew Line, Northville, MI (US); Jerry R. Brown, Northville, MI (US); James Creighton, Northville Township, MI (US); Daniel Ferretti, Commerce Township, MI (US); Christopher J. Kiehler, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 12/793,745

(22) Filed: Jun. 4, 2010

(65) Prior Publication Data

US 2011/0298240 A1 Dec. 8, 2011

(51) Int. Cl.
*B60N 2/02* (2006.01)
(52) U.S. Cl.
USPC .................. 296/64; 296/65.13; 297/344.1
(58) Field of Classification Search
USPC .......... 296/63, 64, 65.01, 65.13, 67; 297/311, 297/344.1, 344.11
See application file for complete search history.

(56) References Cited

U.S. PATENT DOCUMENTS

| | | | |
|---|---|---|---|
| 3,572,818 A | 3/1971 | Lohr | |
| 4,889,379 A * | 12/1989 | Aso | 296/64 |
| 6,302,483 B1 | 10/2001 | Ricaud et al. | |
| 6,666,514 B2 | 12/2003 | Muraishi et al. | |
| 6,722,737 B2 | 4/2004 | Kanai | |
| 6,991,060 B2 | 1/2006 | Chernoff et al. | |
| 7,484,786 B2 * | 2/2009 | Muck et al. | 296/65.09 |
| 7,597,376 B2 * | 10/2009 | Makala et al. | 296/65.13 |
| 2005/0046220 A1 | 3/2005 | Hernandez et al. | |
| 2007/0216186 A1 * | 9/2007 | Sumida et al. | 296/64 |
| 2010/0001546 A1 * | 1/2010 | Christensen | 296/65.13 |

* cited by examiner

*Primary Examiner* — Glenn Dayoan
*Assistant Examiner* — Jason S Daniels
(74) *Attorney, Agent, or Firm* — Vichit Chea; Price Heneveld LLP

(57) ABSTRACT

A monopod seat structure including first and second sides. A back is pivotally connected to the seat. A vertical support column is disposed below the seat and positioned substantially centrally between the first and second sides of the seat. A side support member includes a top portion operably connected to one of the first and second sides. A bottom portion is operably connected to a transmission hump of a vehicle.

18 Claims, 5 Drawing Sheets

MONOPOD SEAT STRUCTURE FOR AUTOMOTIVE SEATS AND METHOD

FIELD OF THE INVENTION

The present invention generally relates to a monopod seat structure for automotive seats, and more particularly relates to a monopod seat structure that provides additional foot room and storage capacity.

BACKGROUND OF THE PRESENT INVENTION

Vehicle seats are typically supported by at least four legs positioned substantially proximate the lateral corners of the vehicle seat. Versatility in vehicle seat support structures is generally uncommon, and accordingly, the potential for maximum storage space is lost.

SUMMARY OF THE PRESENT INVENTION

One aspect of the present invention includes a monopod seat structure having a seat including first and second sides. A back is pivotally connected to the seat. A vertical support column is disposed below the seat and positioned substantially centrally between the first and second sides of the seat. A side support member includes a top portion operably connected to one of the first and second sides. A bottom portion is operably connected to a transmission hump of a vehicle.

Another aspect of the present invention includes a seat assembly having a seat. A left third of the seat defines a first side portion. A right side of the seat defines a second side portion. A central third of the seat defines a central portion. A vertical column is disposed below the central portion of the seat. A side support member is operably connected to the seat. A web connects the side support to the vertical support column.

Yet another aspect of the present invention includes a method for making a method of making a vehicle seat assembly. A seat is provided having a central portion and first and second sides. A vertical support column is connected to a bottom portion of the seat substantially below the central portion of the seat. A top portion of a side support member is connected to one of the first and second sides and a bottom portion of the side support member to a vehicle transmission hump.

These and other aspects, objects, and features of the present invention will be understood and appreciated by those skilled in the art upon studying the following specification, claims, and appended drawings.

DETAILED DESCRIPTION OF EMBODIMENTS

Figure 1:
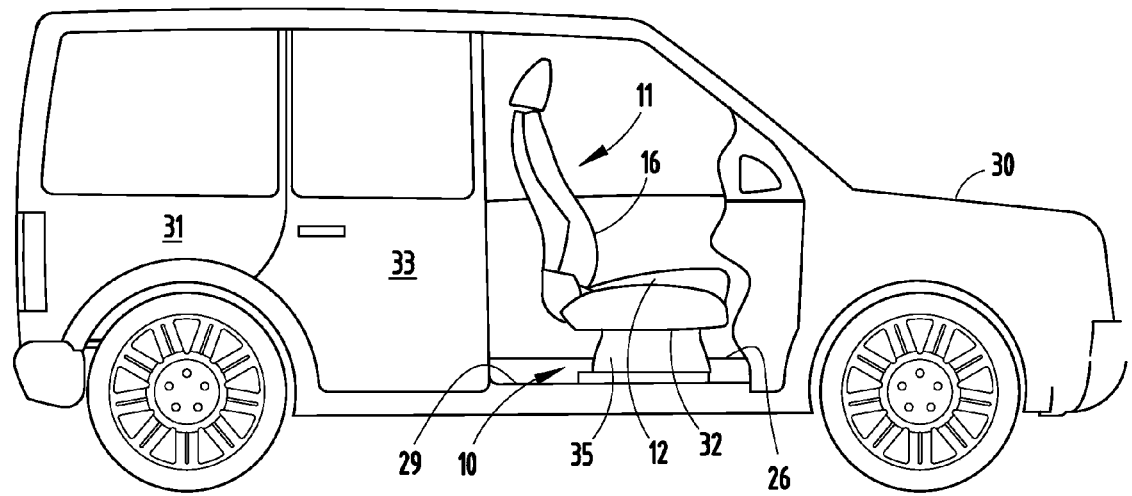
FIG. 1 is a side elevational view of one embodiment of a vehicle incorporating one embodiment of the monopod seat structure of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
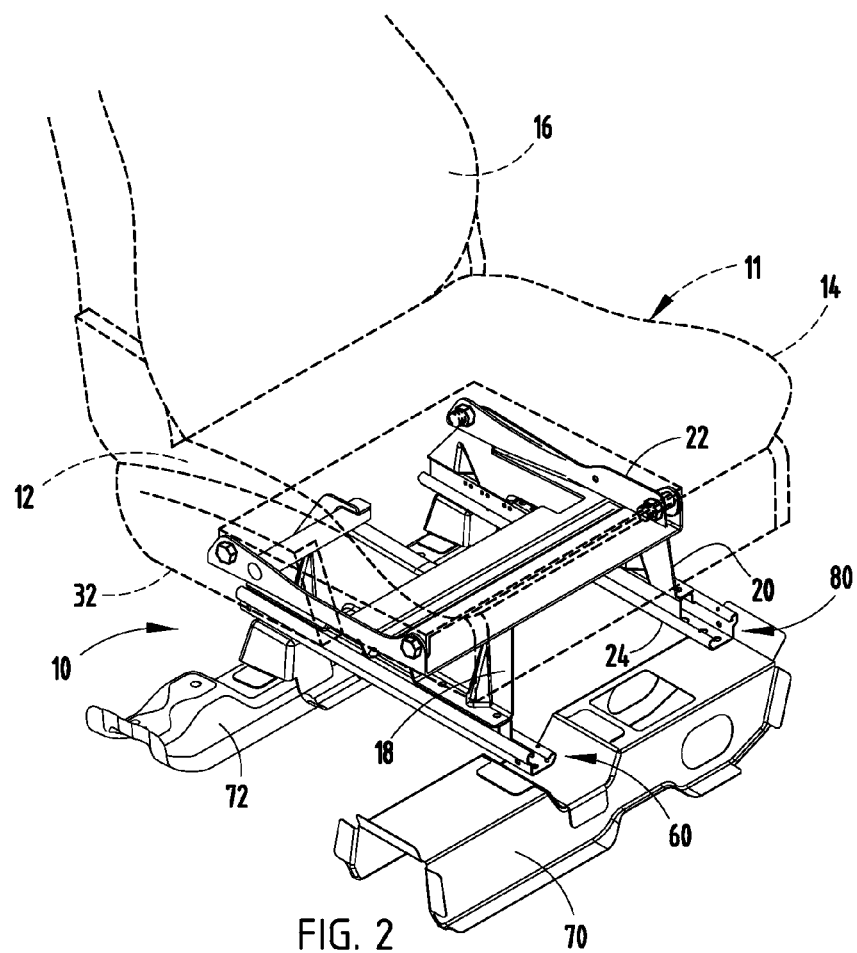
FIG. 2 is a top right perspective view of one embodiment of the monopod seat structure of the present invention.

Referring to FIGS. 1 and 2, the reference numeral 10 generally designates a monopod seat structure that includes a seat 11 having a first side 12 and a second side 14. A back 16 is pivotally connected to the seat 11. A vertical support column 18 is operably connected with and disposed below the seat 11 and positioned substantially centrally between the first and second sides 12, 14 of the seat 11. A side support member 20 includes a top portion 22 operably connected to the second side 14 of the seat 11. A bottom portion 24 of the side support member 20 is operably connected to a transmission hump 26 of a vehicle 30.

Referring again to FIG. 1, the monopod seat structure 10 of the present invention is generally designed for use in a variety of vehicles 30 to support any of the seats 11, including a driver's seat, a passenger seat, or rear seats of the vehicle 30. The embodiment illustrated in FIG. 2 is adapted for connection with a floor 29 of the vehicle 30 and the seat 11 located on the passenger side, or right side, of the vehicle 30. The monopod seat structure 10 increases space below the seat 11 for the feet of a user sitting behind the passenger seat 11, as well as for storage below the seat 11. Among other features, the monopod seat structure 10 provides additional room between the seat 11 and a sidewall 31 or a side door 33 of the vehicle 30. It is contemplated that the vertical support column 18 could be covered by a shroud 35 that protects and hides from view the vertical support column 18.

Figure 3:
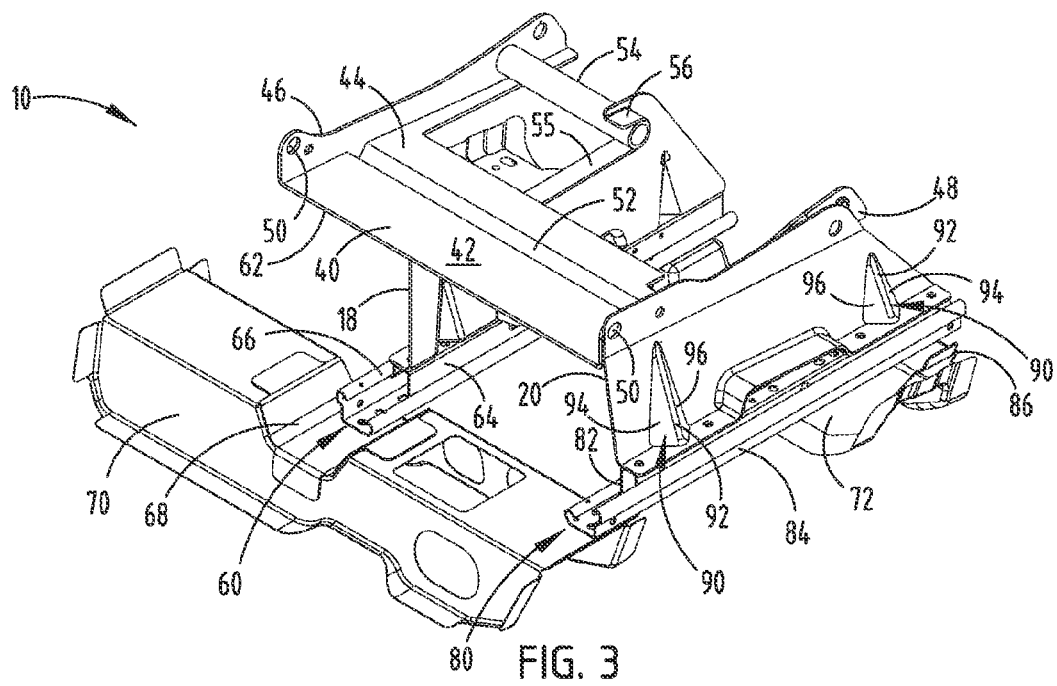
FIG. 3 is a top left side perspective view of the monopod seat structure of FIG. 2.
Figure 4:
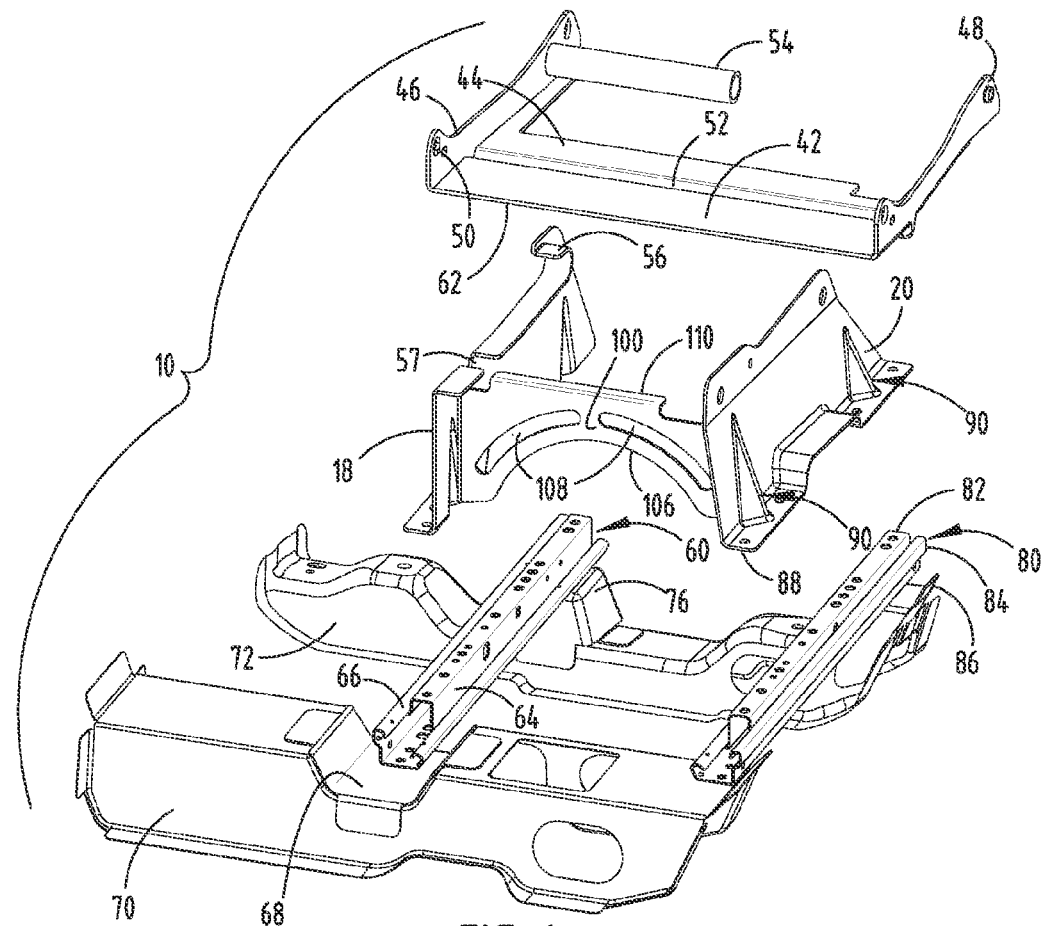
FIG. 4 is a top right exploded perspective view of the monopod seat structure of FIG. 2.

Referring now to FIGS. 2-4, the monopod seat structure 10 includes a center bracket 40 adapted for connection with a bottom side 32 of the seat 11. The center bracket 40 includes a front planar portion 42 and a rear planar portion 44. First and second side flanges 46, 48 connect the front planar portion 42 with the rear planar portion 44. The side flanges 46, 48 include fastener apertures 50 that secure the bottom side 32 of the seat 11 to the monopod seat structure 10. A channel 52 is positioned between the front planar portion 42 and the rear planar portion 44. A hollow tubular member 54 extends orthogonally from the first side flange 46 inwardly and is captured by a top flange 55 of the vertical support column 18. The top flange 55 includes a forward slot 57 which receives the channel 52, and a J-shaped receiver 56 that is integral with the vertical support column 18, and which has an inner diameter that is slightly larger than an outer diameter of the hollow tubular member 54, such that the J-shaped receiver 56 is designed to snugly receive the hollow tubular member 54. The vertical support column 18 is supported on and operably coupled with an outboard slide system 60. The vertical support column 18 extends upwardly from the outboard slide system 60 and abuts an underside 62 of the center bracket 40. More specifically, a top surface of the J-shaped receiver 56 abuts the center bracket 40, thereby supporting the seat 11 in position in the vehicle 30.

As shown in FIGS. 2 and 3, the outboard slide system 60 includes an outboard slide 64 and an outboard track 66. The outboard slide 64 is operably connected to the vertical support column 18 and is linearly translatable forward and rearward over the outboard track 66. The outboard track 66 is fixedly connected to a center portion 68 of front and rear cross members 70, 72 that connect with the floor 29 of the vehicle 30 and which support the monopod seat structure 10 in position inside the vehicle 30. The front cross member 70 and the rear cross member 72 are fixedly connected to the floor 29 of the vehicle 30 by mechanical fasteners, welding, etc. The rear cross member 72 includes a track support 76 (FIG. 4) that connects with the outboard track 66. The outboard slide 64 moves relative to the outboard track 66 over ball bearings 78 (FIG. 5A), as discussed in further detail below.

Referring once again to FIGS. 4-6, the monopod seat structure 10 also includes an inboard slide system 80 having an inboard slide 82 and an inboard track 84 connected to an inboard portion 86 of the front cross member 70 and the rear cross member 72. The inboard track 84 is fixedly connected to the inboard portion 86 of the front cross member 70 and rear cross member 72 and the inboard slide 82 is linearly translatable forward and rearward over the inboard track 84. The inboard slide 82 is fixedly connected to a base 88 of the side support member 20, which is in turn operably connected to the center bracket 40. The planar extent of the base 88 is perpendicular to the planar extent of the side support member 20 and is connected to the inboard slide 82 by mechanical fasteners, welding, etc. Lateral supports 90 extend outward from the side support member 20 to further rigidify and strengthen the side support member 20. In the illustrated embodiment, the lateral supports 90 are formed from a partial pyramidal indent 92 (FIG. 3) having first and second sides 94, 96 (FIG. 8) that are integrally connected and which taper inwardly from the base 88 to the side support member 20. However, it is contemplated that the lateral supports 90 could take on a variety of different shapes. In addition, the lateral supports 90 may be integral with the side support member 20 or connected to the side support member 20 by mechanical fasteners or the like.

Figure 5:
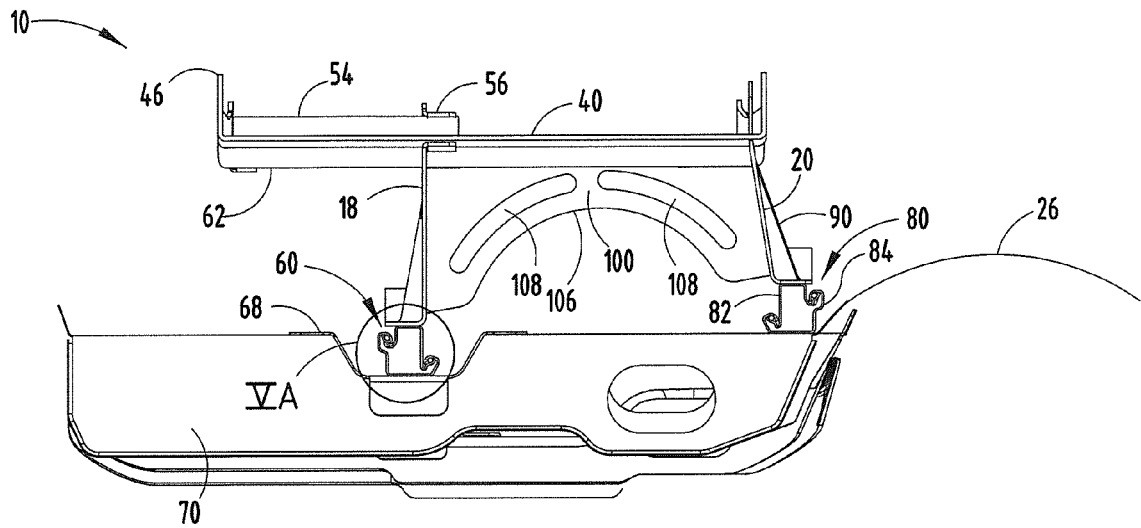
FIG. 5 is a front elevational view of the monopod seat structure of FIG. 2.
Figure 5A:
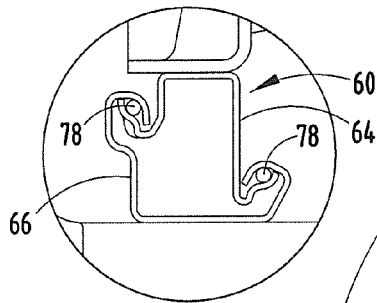
FIG. 5A is an enlarged front elevational view taken at area VA of FIG. 5.
Figure 6:
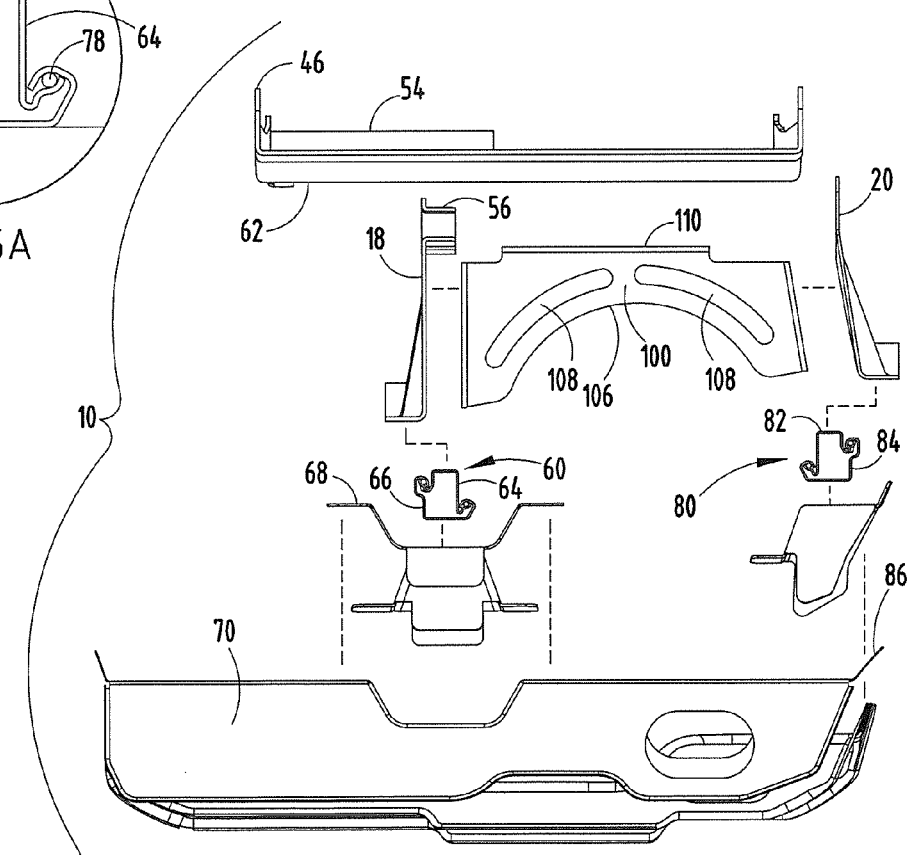
FIG. 6 is a front exploded elevation view of the monopod seat structure of FIG. 2.

Referring now to FIGS. 5 and 6, the inboard slide system 80 is positioned a predetermined distance above the outboard slide system 60. It is contemplated that the inboard slide system 80 may be adjacent to or connected with the transmission hump 26 of the vehicle 30. In addition, the rear cross member 72 is positioned a predetermined distance lower than the front cross member 70. Accordingly, an individual sitting behind the monopod seat structure 10 can easily place feet between the inboard slide system 80 and the outboard slide system 60, as well as between the outboard slide system 60 and the sidewall 31 or side door 33 of the vehicle 30.

Figure 7:
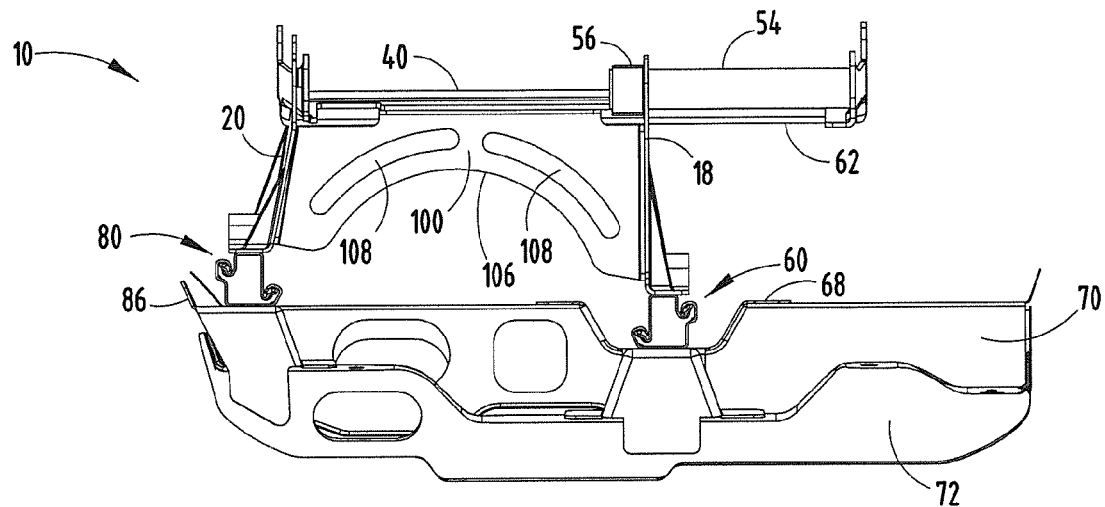
FIG. 7 is a rear elevational view of the monopod seat structure of FIG. 2.

Referring again to FIGS. 5 and 6, a support web 100 extends orthogonally to the side support member 20 and the vertical support column 18 and provides additional support to the side support member 20 and the vertical support column 18 during use and even in the unfortunate circumstance of a collision event. In addition, the support web 100 helps to align the side support member 20 with the vertical support column 18 during movement of the seat 11 between a forward position 102 (FIG. 9) and a rearward position 104 (FIG. 10). The support web 100, as shown, includes an arcuate underside 106 (FIG. 7) to provide additional space below the seat 11 and also includes one or more cutouts 108 that minimize the weight of the support web 100 while maintaining stability and structural rigidity to the side support member 20 and the vertical support column 18. A top tab 110 of the support web 100 is adapted to support the underside 62 of the center bracket 40, which in turn supports the seat 11.

Figure 8:
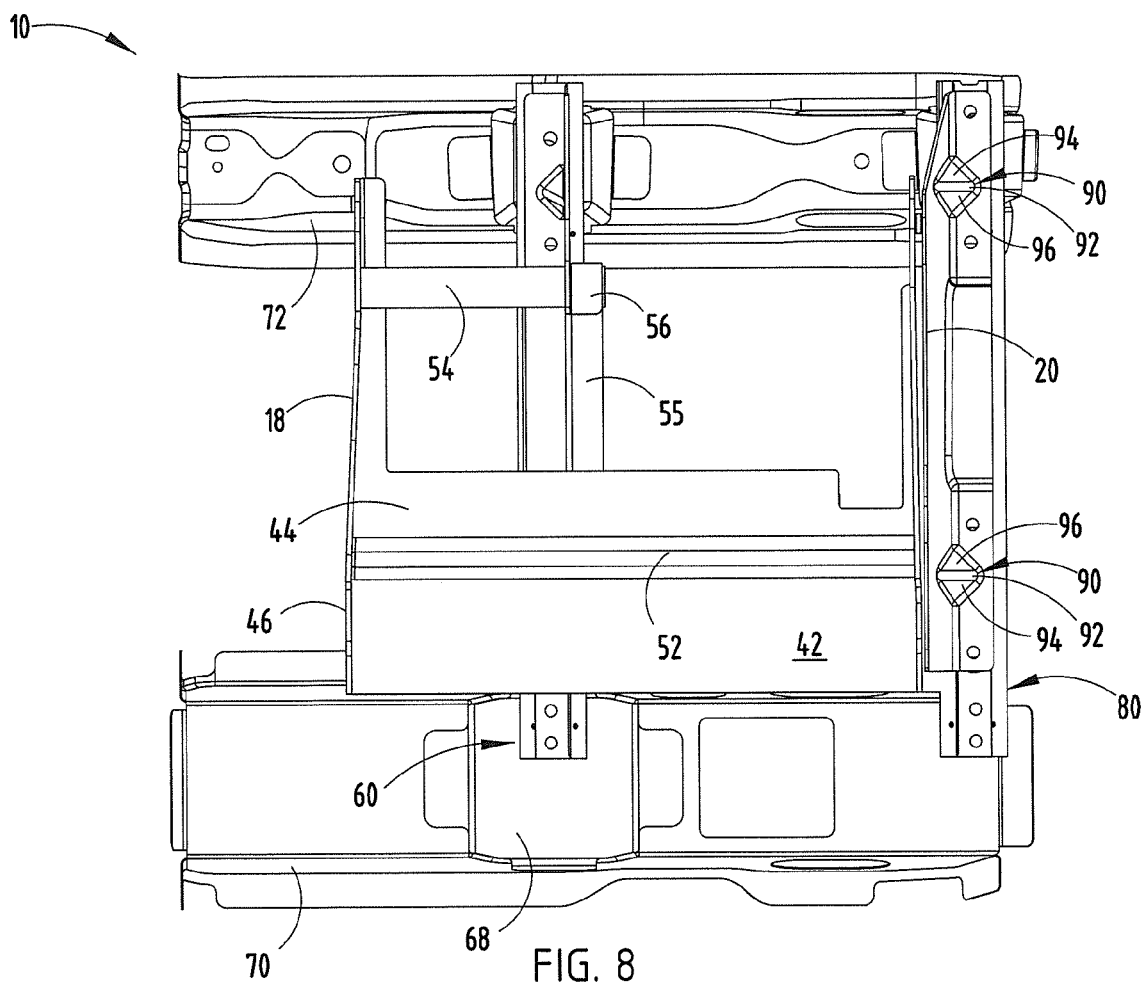
FIG. 8 is a top plan view of the monopod seat structure of FIG. 2.
Figure 9:
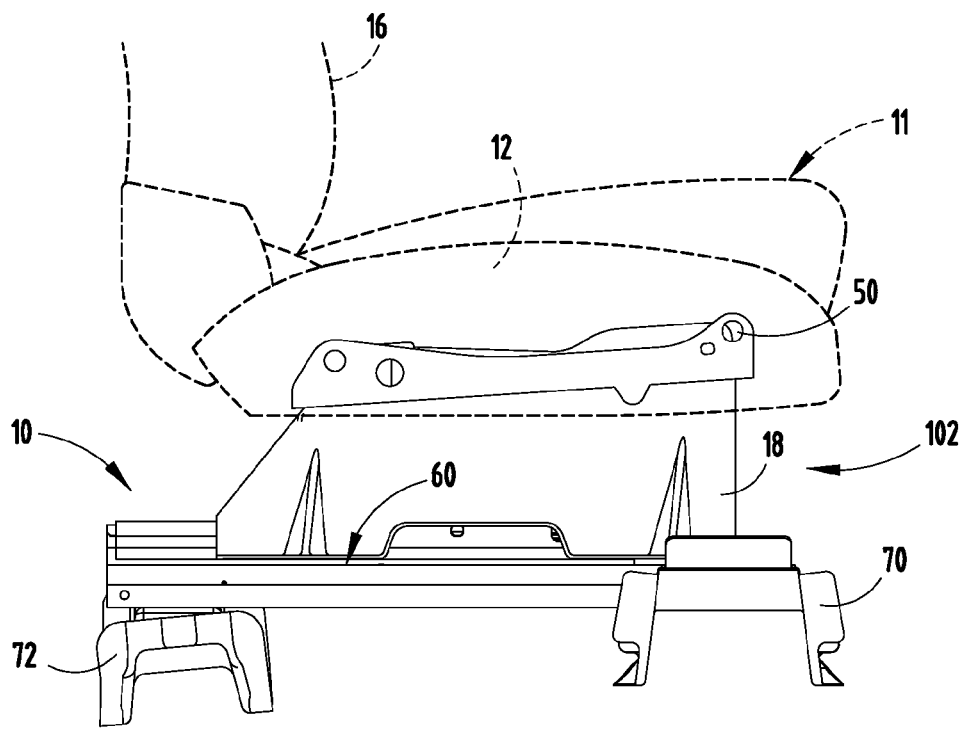
FIG. 9 is a right side elevational view of one embodiment of the monopod seat structure in a forward position.
Figure 10:
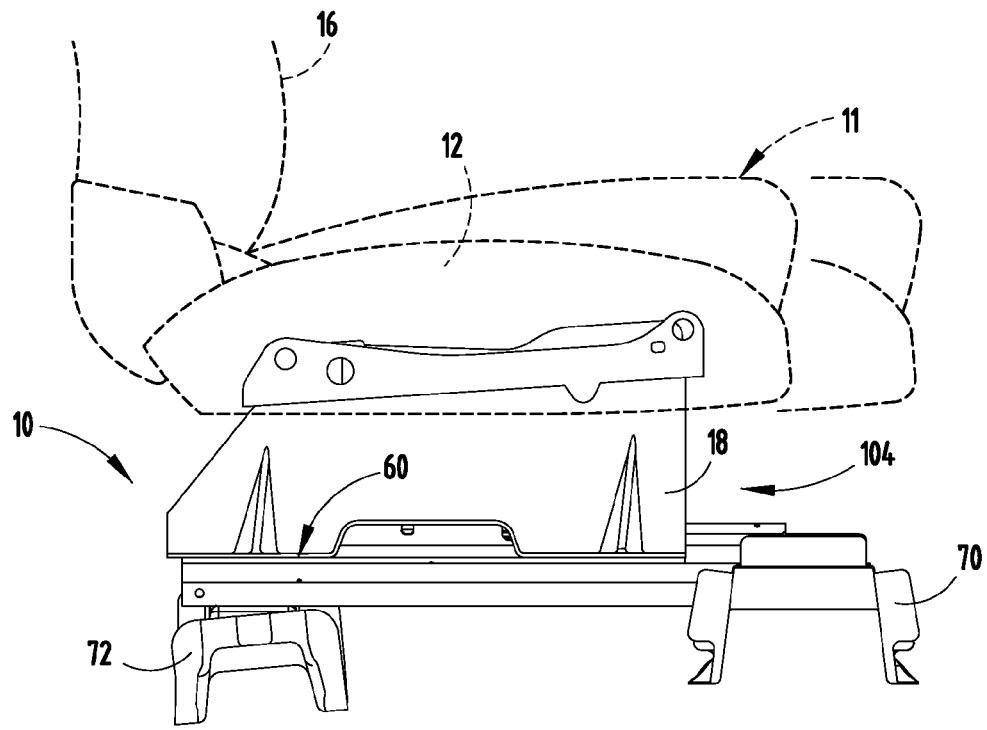
FIG. 10 is a right side elevational view of one embodiment of the monopod seat structure in a rearward position.

Referring now to FIGS. 8 and 9, movement of the inboard slide 82 and outboard slide 64 over the inboard track 84 and outboard track 66, respectively, translates to linear movement of the seat 11 between the forward position 102 and rearward position 104. When the seat 11 is slid to the forward position 102, forward stops (not shown) disposed in the inboard slide system 80 and outboard slide system 60 engage such that the inboard slide 82 and outboard slide 64 cannot extend any further forward relative to the inboard track 84 and outboard track 66, respectively (FIG. 8). Similarly, when the seat 11 is slid to the rearward position 104, rear stops (not shown) engage such that the inboard slide 82 cannot move any further back relative to the inboard track 84. At the same time, the outboard slide 64 cannot move any further back relative to the outboard track 66.

The monopod seat structure 10 as outlined in detail above provides a stable seating arrangement that maximizes both storage space below the seat 11, and at the same time provides additional foot room to passengers located behind the monopod seat structure 10. The monopod seat structure 10 is linearly slidable forward and rearward and allows for the seats 11 to maintain the same functional qualities as are generally afforded by traditional seating arrangements.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A monopod seat structure comprising:
a seat and a seat back;
a vertical support column disposed substantially centrally below first and second sides of the seat, wherein a bottom of the vertical support column is slidably coupled with a first rail and a top portion of the vertical support column includes a forward slot and a hooked receiver;
a side support member having a top portion operably connected to the first rail, and a bottom portion slidably coupled with a second rail which is operably connected to a transmission hump of a vehicle;
a web disposed between the vertical support column and the side support member; and
a center bracket disposed on the vertical support column and side support member, the center bracket including a channel configured to engage the forward slot and a tubular member rotatably coupled with the hooked receiver.

2. The monopod seat structure of claim 1, further comprising:
a shroud that covers side portions of the vertical support column.

3. The monopod seat structure of claim 1, further comprising:
a center bracket operably connects the vertical support column to the seat.

4. The monopod seat structure of claim 1, wherein the web includes first and second sides having a height substantially equal to a height of the vertical support column and side support member.

5. The monopod seat structure of claim 1, further comprising:
   lateral supports extending from at least one of the side support member and the vertical support column.

6. The monopod seat structure of claim 4, wherein the web is substantially planar, and wherein the planar extent of the web is substantially vertically oriented.

7. A vehicle seat assembly comprising:
   a seat;
   a vertical column that has a rear, forward-facing receiver, and t is disposed on a first rail below a central portion of the seat;
   a side support member disposed on a second rail below a side portion of the seat; and
   a bracket disposed on the vertical column and having a forward securing channel engaging the vertical column and a rear tubular member engaging the forward-facing receiver.

8. The vehicle seat assembly of claim 7, wherein the side support member is connected to a transmission hump of a vehicle.

9. The vehicle seat assembly of claim 7, wherein a bottom portion of the vertical column is engaged with a first slide system and a bottom portion of the side support member is slidably engaged with a second slide system.

10. The vehicle seat assembly of claim 7, further comprising:
    a front cross member and a rear cross member that support the first rail and second rail.

11. The vehicle seat assembly of claim 9, wherein the first and second slide systems are operably coupled with front and rear cross members.

12. The vehicle seat assembly of claim 7, wherein the web includes at least one aperture.

13. The vehicle seat assembly of claim 12, wherein the web is substantially planar, and wherein the planar extent of the web is substantially vertically oriented.

14. The vehicle seat assembly of claim 7, wherein the vertical column is juxtaposed approximately 1.97 inches (50 mm) laterally outboard from the center of the seat.

15. A method of making a vehicle seat assembly comprising:
    providing a seat;
    connecting a bracket under the seat that includes a locating channel and a rearward tubular member;
    connecting a vertical support column to a bottom portion of the bracket substantially below a central portion of the seat;
    slidably coupling the vertical support column with a first rail;
    connecting a top portion of a side support member to one of first and second sides of the seat and a bottom portion of the side support member to a side of a vehicle transmission hump; and
    connecting a web between the vertical support column and the side support member, the web including a raised intermediate section to provide additional clearance for the feet of a passenger located behind the vehicle seat assembly.

16. The method of claim 15, further comprising:
    connecting the web disposed below the seat between the side support member and the vertical support column.

17. The method of claim 15, further comprising:
    slidably engaging a bottom portion of the vertical support column to a first rail and a bottom portion of the side support member to a second rail.

18. The method of claim 17, further comprising:
    positioning the second rail vertically higher than the first rail.

* * * * *